(12) United States Patent
Mizrahi et al.

(10) Patent No.: US 12,160,267 B2
(45) Date of Patent: Dec. 3, 2024

(54) DYNAMIC RADIO FREQUENCY (RF) BEAM PATTERN ADAPTATION IN A WIRELESS COMMUNICATIONS SYSTEM (WCS)

(71) Applicant: Corning Research & Development Corporation, Corning, NY (US)

(72) Inventors: Gavriel Mizrahi, Tel Aviv (IL); Shirish Nagaraj, Pleasanton, CA (US); Deepak Pengoria, Milpitas, CA (US); Hsien Li Woo, San Diego, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 226 days.

(21) Appl. No.: 17/747,941

(22) Filed: May 18, 2022

(65) Prior Publication Data

US 2022/0385367 A1   Dec. 1, 2022

Related U.S. Application Data

(60) Provisional application No. 63/193,537, filed on May 26, 2021.

(51) Int. Cl.
*H04B 10/2575* (2013.01)
*H04W 4/02* (2018.01)
(Continued)

(52) U.S. Cl.
CPC ...... *H04B 10/25753* (2013.01); *H04W 4/026* (2013.01); *H04W 72/046* (2013.01); *H04W 72/51* (2023.01)

(58) Field of Classification Search
CPC ............ H04B 10/25753; H04W 72/51; H04W 4/026; H04W 72/046
(Continued)

(56) References Cited

U.S. PATENT DOCUMENTS

| 6,504,636 B1 | 1/2003 | Seto et al. |
| 8,310,975 B2 | 11/2012 | Sundaresan et al. |

(Continued)

FOREIGN PATENT DOCUMENTS

WO    2017/008257 A1    1/2017

*Primary Examiner* — Mohammad R Sedighian
(74) *Attorney, Agent, or Firm* — William D. Doyle

(57) ABSTRACT

Dynamic radio frequency (RF) beam pattern adaptation in a wireless communications system (WCS) is provided. The WCS typically includes a number of wireless devices, such as remote units and/or base stations, for enabling indoor wireless communications to user devices. The wireless devices are typically mounted on a fixed structure. Notably, a wireless device may be preconfigured to support RF beamforming based on an RF beam pattern that corresponds to a configured orientation. However, the wireless device can be installed with a different orientation from the configured orientation, thus requiring the RF beam pattern to be adapted accordingly. In this regard, a wireless device is configured to dynamically determine an actual orientation of the wireless device and automatically adapt the RF beam pattern based on the determined actual orientation. As a result, it is possible to reduce installation and calibration time associated with deployment of the wireless device in the WCS.

15 Claims, 12 Drawing Sheets

(51) Int. Cl.
*H04W 72/044* (2023.01)
*H04W 72/51* (2023.01)

(58) Field of Classification Search
USPC .......................................................... 398/115
See application file for complete search history.

(56) References Cited

U.S. PATENT DOCUMENTS

| | | | |
|---|---|---|---|
| 9,147,935 B2 * | 9/2015 | Keidar | H01Q 1/246 |
| 9,712,191 B2 | 7/2017 | Johansson et al. | |
| 9,960,823 B2 | 5/2018 | Kim et al. | |
| 11,336,125 B2 | 5/2022 | Kimball et al. | |
| 2013/0059619 A1 | 3/2013 | Kim et al. | |
| 2015/0334726 A1 | 11/2015 | Gao et al. | |
| 2016/0360536 A1 | 12/2016 | Bae | |
| 2017/0033904 A1 | 2/2017 | Stirling-Gallacher et al. | |
| 2017/0214444 A1 | 7/2017 | Nigam et al. | |
| 2019/0097712 A1 * | 3/2019 | Singh | H04B 7/0617 |
| 2019/0166527 A1 | 5/2019 | Oketani et al. | |
| 2022/0095257 A1 | 3/2022 | Castaneda et al. | |
| 2022/0149907 A1 | 5/2022 | Göransson | |
| 2022/0149911 A1 | 5/2022 | Li et al. | |
| 2022/0155439 A1 | 5/2022 | Rindal et al. | |
| 2022/0159480 A1 | 5/2022 | Lu et al. | |
| 2022/0173783 A1 | 6/2022 | Dash et al. | |
| 2022/0191855 A1 | 6/2022 | Akkarakaran et al. | |
| 2022/0201389 A1 | 6/2022 | Hassani et al. | |
| 2022/0201675 A1 | 6/2022 | Akkarakaran et al. | |
| 2022/0286867 A1 | 9/2022 | Siomina et al. | |

* cited by examiner

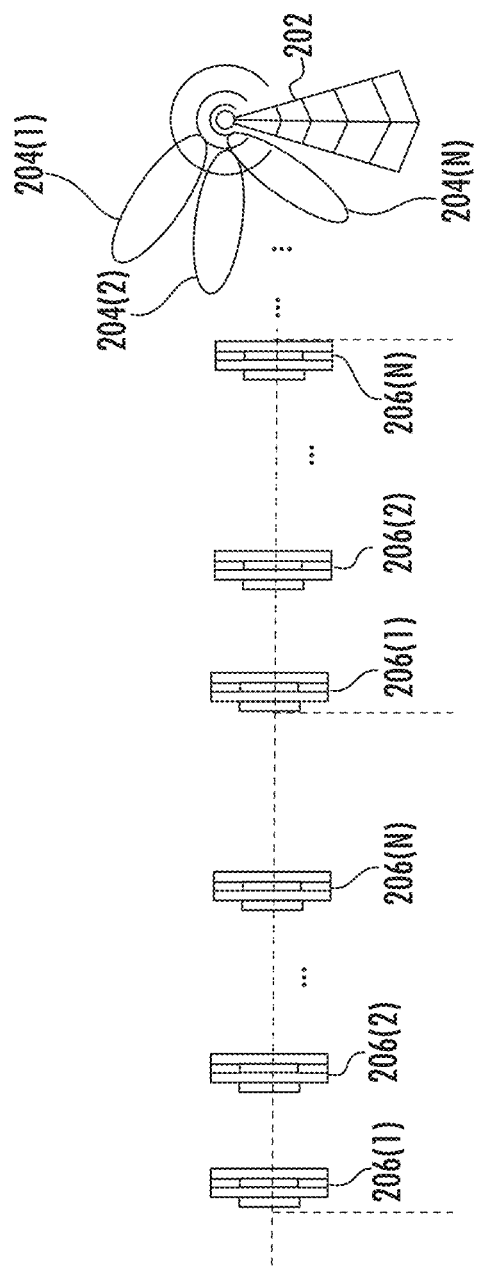
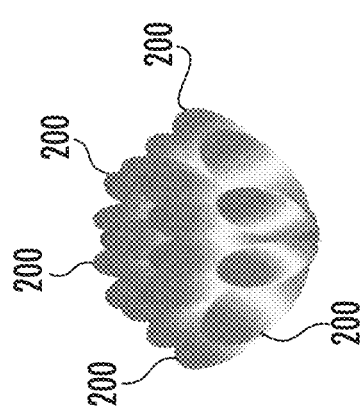
FIG. 2B
PRIOR ART
FIG. 2A
PRIOR ART

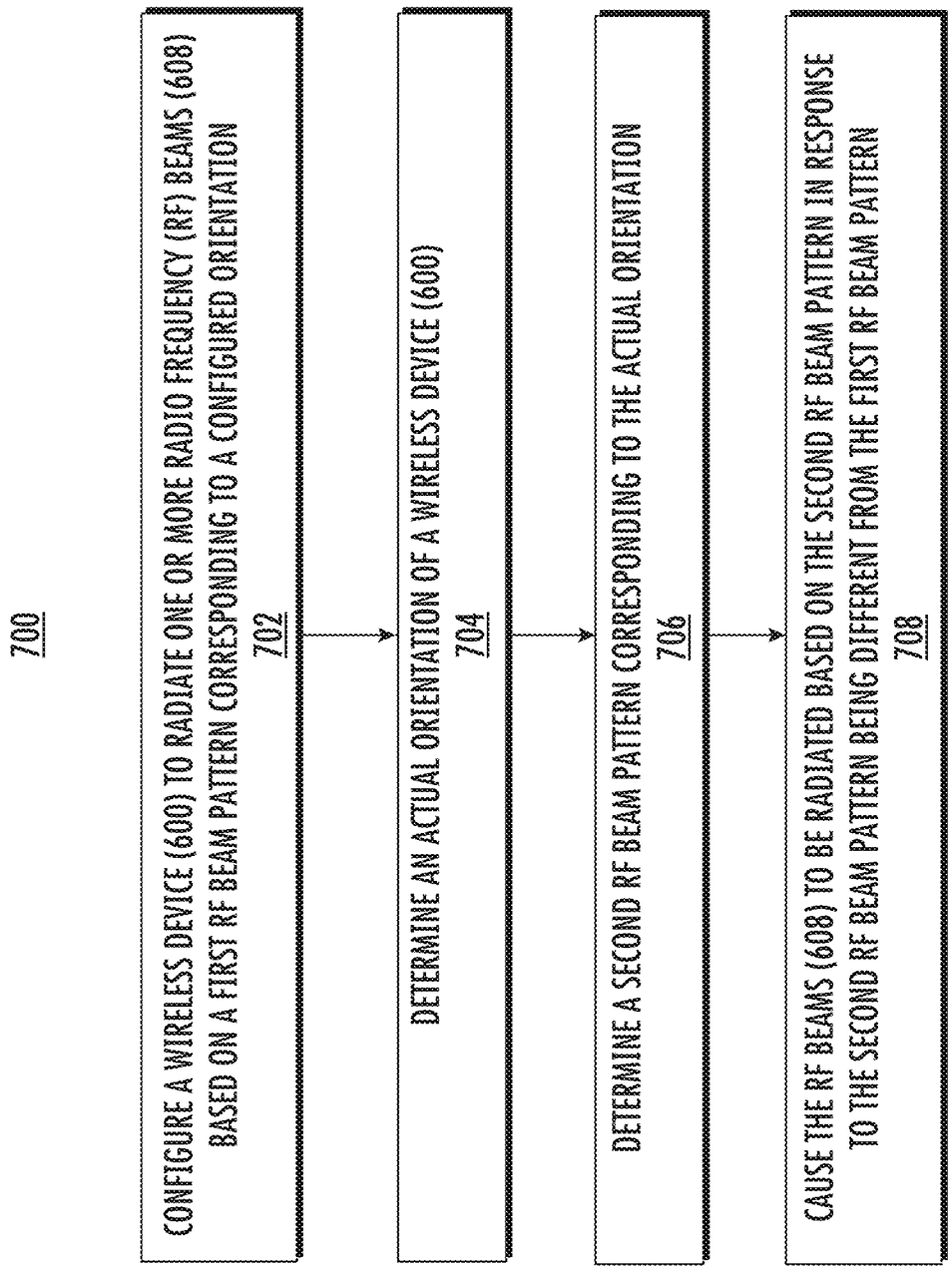

DYNAMIC RADIO FREQUENCY (RF) BEAM PATTERN ADAPTATION IN A WIRELESS COMMUNICATIONS SYSTEM (WCS)

CROSS-REFERENCE TO RELATED APPLICATIONS

This application claims the benefit of priority under 35 U.S.C. § 119 of U.S. Provisional Application Ser. No. 63/193,537, filed May 26, 2021, the content of which is relied upon and incorporated herein by reference in its entirety.

BACKGROUND

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a fifth-generation (5G) or a 5G new-radio (5G-NR) communications system. In this regard, the radio node 102 can function as a 5G or 5G-NR base station (a.k.a. eNodeB) to service the wireless client devices 106(1)-106(W). Notably, the 5G or 5G-NR wireless communications system may be implemented based on a millimeter-wave (mmWave) spectrum that can make the communications signals 110(1)-110(N) more susceptible to propagation loss and/or interference. As such, it is desirable to radiate the RF beams 120(1)-120(N) based on a desirable RF beam pattern to help mitigate signal propagation loss and/or interference in the mmWave spectrum.

SUMMARY

Embodiments disclosed herein include dynamic radio frequency (RF) beam pattern adaptation in a wireless communications system (WCS). The WCS typically includes a number of wireless devices, such as remote units and/or base stations, for enabling indoor wireless communications to user devices. The wireless devices are typically mounted on a fixed structure (e.g., ceiling, wall, lamp post, etc.). Notably, a wireless device may be preconfigured (e.g., at factory)

to support RF beamforming based on an RF beam pattern that corresponds to a configured orientation (e.g., ceiling-mounted). However, the wireless device can be installed with a different orientation (e.g., wall-mounted) from the configured orientation, thus requiring the RF beam pattern to be adapted accordingly. In this regard, in embodiments disclosed herein, a wireless device is configured to dynamically determine an actual orientation of the wireless device and automatically adapt the RF beam pattern based on the determined actual orientation. As a result, it is possible to reduce installation and calibration time associated with deployment of the wireless device in the WCS.

One exemplary embodiment of the disclosure relates to a wireless device. The wireless device includes an antenna array. The antenna array is configured to radiate one or more RF beams based on a first RF beam pattern corresponding to a configured orientation. The wireless device also includes a control circuit. The control circuit is configured to determine an actual orientation of the wireless device. The control circuit is also configured to determine a second RF beam pattern corresponding to the actual orientation. The control circuit is also configured to cause the one or more RF beams to be radiated based on the second RF beam pattern in response to the second RF beam pattern being different from the first RF beam pattern.

An additional exemplary embodiment of the disclosure relates to a method for enabling dynamic RF beam pattern adaptation in a wireless device in a WCS. The method includes configuring the wireless device to radiate one or more RF beams based on a first RF beam pattern corresponding to a configured orientation. The method also includes determining an actual orientation of the wireless device. The method also includes determining a second RF beam pattern corresponding to the actual orientation. The method also includes causing one or more RF beams to be radiated based on the second RF beam pattern in response to the second RF beam pattern being different from the first RF beam pattern.

An additional exemplary embodiment of the disclosure relates to a WCS. The WCS includes a wireless device. The wireless device includes an antenna array. The antenna array is configured to radiate one or more RF beams based on a first RF beam pattern corresponding to a configured orientation. The wireless device also includes a control circuit. The control circuit is configured to determine an actual orientation of the wireless device. The control circuit is also configured to determine a second RF beam pattern corresponding to the actual orientation. The control circuit is also configured to cause the one or more RF beams to be radiated based on the second RF beam pattern in response to the second RF beam pattern being different from the first RF beam pattern.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 2A-2B are graphic diagrams providing exemplary illustration of a number of fundamental aspects related to radio frequency (RF) beamforming;

FIG. 7 is a flowchart of an exemplary process that can be employed by the wireless device of FIG. 6A to support dynamic RF beam pattern adaptation;

DETAILED DESCRIPTION

Embodiments disclosed herein include dynamic radio frequency (RF) beam pattern adaptation in a wireless communications system (WCS). The WCS typically includes a number of wireless devices, such as remote units and/or base stations, for enabling indoor wireless communications to user devices. The wireless devices are typically mounted on a fixed structure (e.g., ceiling, wall, lamp post, etc.). Notably, a wireless device may be preconfigured (e.g., at factory) to support RF beamforming based on an RF beam pattern that corresponds to a configured orientation (e.g., ceiling-mounted). However, the wireless device can be installed with a different orientation (e.g., wall-mounted) from the configured orientation, thus requiring the RF beam pattern to be adapted accordingly. In this regard, in embodiments disclosed herein, a wireless device is configured to dynamically determine an actual orientation of the wireless device and automatically adapt the RF beam pattern based on the determined actual orientation. As a result, it is possible to reduce installation and calibration time associated with deployment of the wireless device in the WCS.

Figure 1:
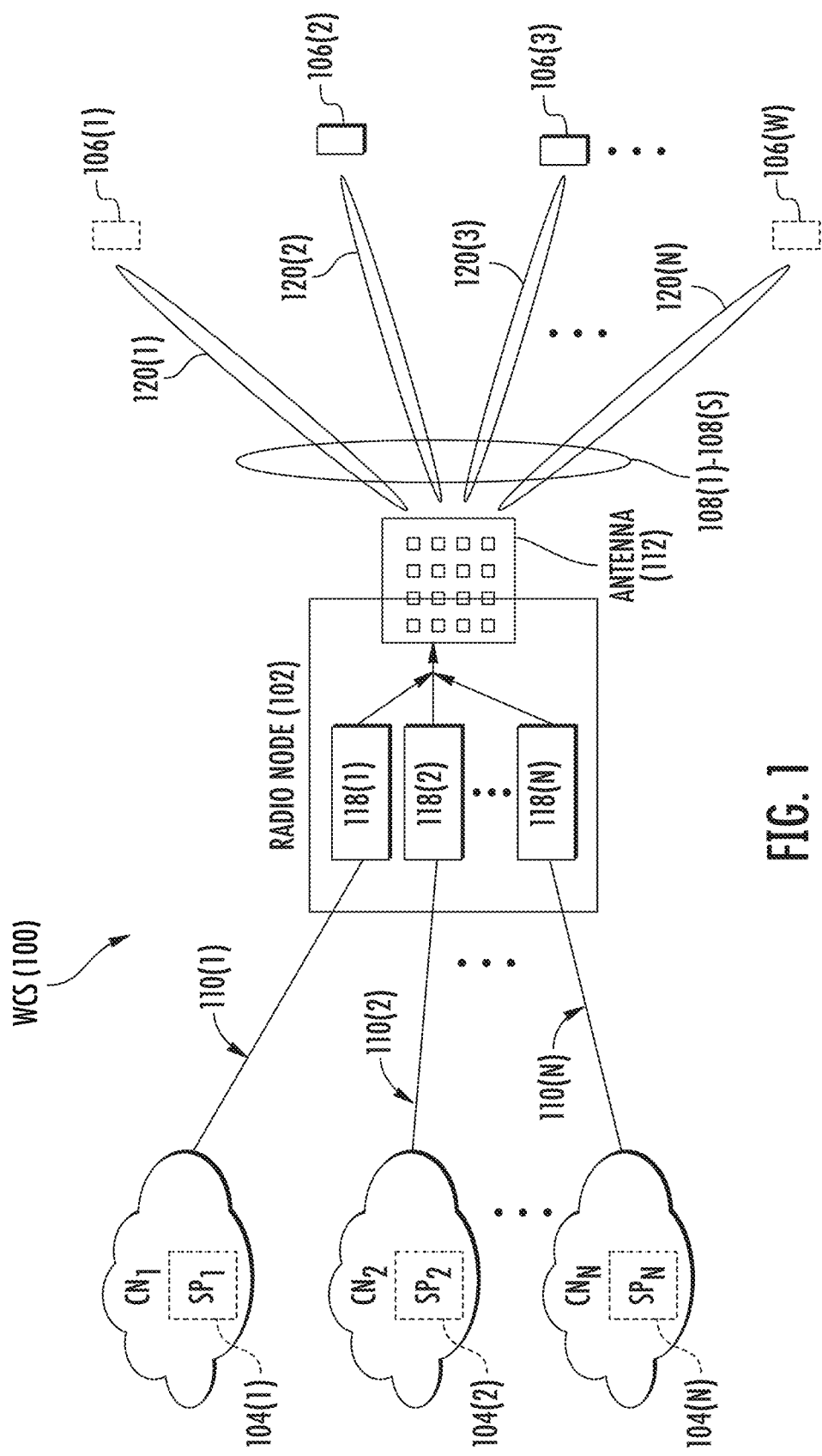
FIG. 1 is a schematic diagram of an exemplary wireless communications system (WCS), such as a distributed communications system (DCS), configured to distribute communications services to remote coverage areas.
Figure 3:
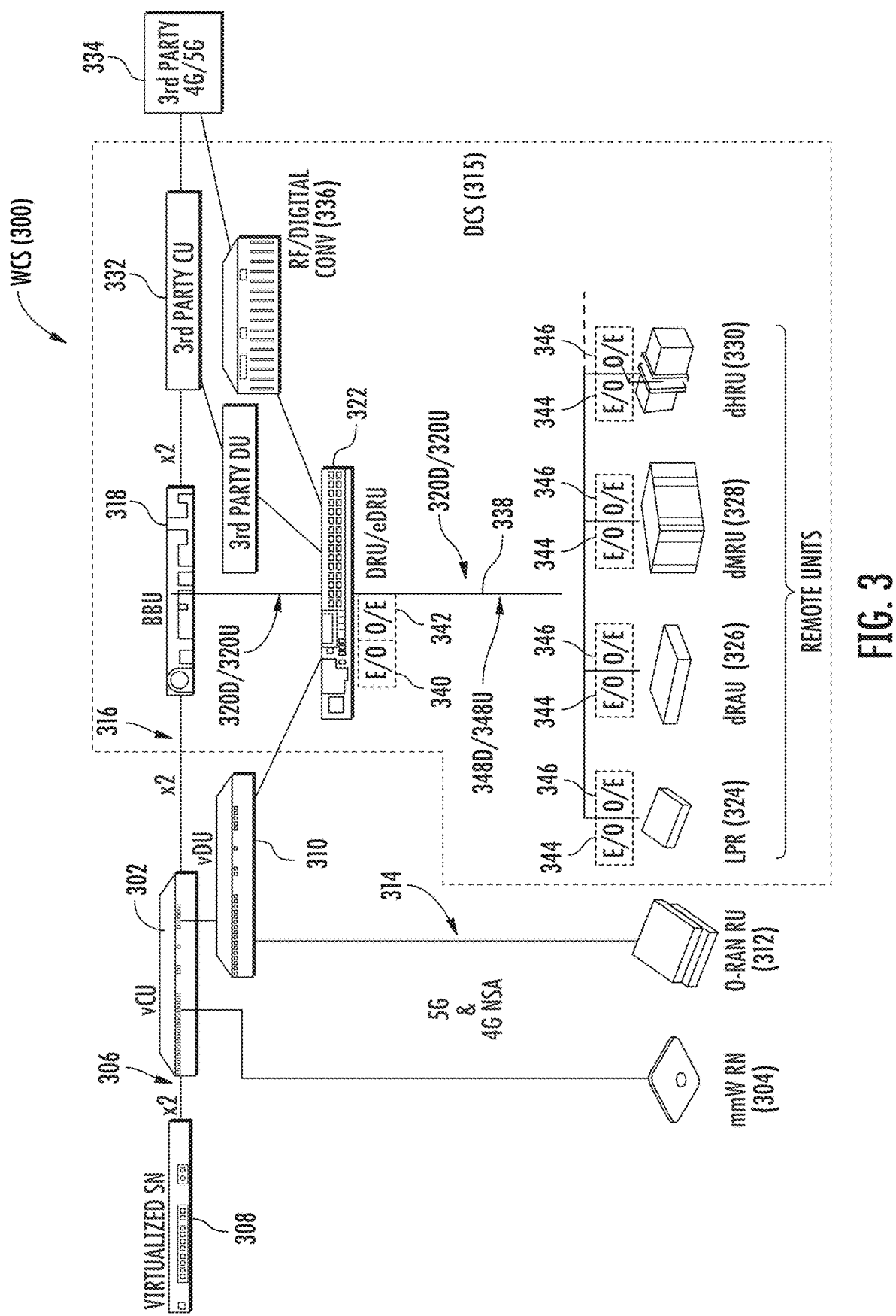
FIG. 3 is a schematic diagram of an exemplary WCS configured according to any of the embodiments disclosed herein to support dynamic RF beam pattern adaptation.

Before discussing a wireless communications circuit of the present disclosure configured to adapt a GoB to improve coverage, reduce complexity and latency, and conserve energy, starting at FIG. 3, a brief overview is first provided with reference to FIGS. 2A-2B to help explain some fundamental aspects related to RF beamforming.

FIGS. 2A-2B are graphic diagrams providing exemplary illustrations of a number of fundamental aspects related to RF beamforming. In general, beamforming refers to a technique that uses multiple antennas to simultaneously radiate an RF signal in an RF spectrum, such as a millimeter wave (mmWave) spectrum. The multiple antennas, also called "antenna elements," are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then coupled to specific antennas in the antenna array for simultaneous radiation in the RF spectrum. As illustrated in FIG. 2A, by pre-processing the RF signal based on multiple beam weight sets, it may be possible to form multiple RF beams 200 pointing to multiple directions radiating from antenna elements in an antenna array, respectively.

Each beam weight in a given beam weight set is a complex weight consisting of a respective phase term and a respective amplitude term. The phase terms in the complex beam weight can be determined to cause the multiple simultaneously radiated RF signals to constructively combine in one direction to form the RF beams 200, while destructively averaging out in other directions. In this regard, the phase term can determine how the RF beams 200 are formed and which direction the RF beams 200 are pointing to. On the other hand, the amplitude terms in the complex beam weight may determine how many of the antennas in the antenna array are utilized to simultaneously radiate the RF signals. Notably, when more antennas are utilized to simultaneously radiate the RF signals, the RF beams 200 will become more concentrated to have a narrower beamwidth and a higher beamformed antenna gain. In contrast, when fewer antennas are utilized to simultaneously radiate the RF signals, the RF beams 200 will become more spread out to have a wider beamwidth and a lesser beamformed antenna gain. In this regard, the amplitude term can determine the beamwidth of the RF beams 200.

Although it may be possible for the antennas in the antenna array to form the multiple RF beams 200 in FIG. 2A in the multiple directions, an actual number of the RF beams 200 is typically limited by a standard-defined parameter known as the synchronization signal block (SSB), which is further discussed next in FIG. 2B. In this regard, FIG. 2B is a graphic diagram providing an exemplary illustration on how the SSB limits the actual number the RF beams 200 that may be formed by the antennas in the antenna array.

As shown in FIG. 2B, a 5G-NR gNB 202 is configured to radiate a number of reference beams 204(1)-204(N) in different directions of a 5G-NR coverage cell. The reference beams 204(1)-204(N) are associated with a number of SSBs 206(1)-206(N), respectively. Each of the SSBs 206(1)-206(N) may include a primary synchronization signal (PSS), a secondary synchronization signal (SSS), and a 5G-NR physical broadcast channel (PBCH).

In this regard, a 5G-NR UE in the 5G-NR coverage cell can sweep through the reference beams 204(1)-204(N) to identify a candidate reference beam(s) associated with a strongest reference signal received power (RSRP). Further, the 5G-NR UE may decode a candidate SSB(s) associated with the identified candidate reference beam(s) to acquire such information as physical cell identification (PCI) and a PBCH demodulation reference signal (DMRS). Based on the candidate reference beam(s) reported by the 5G-NR UE, the 5G-NR gNB 202 may pinpoint location of the 5G-NR UE and steer a data-bearing RF beam toward the 5G-NR UE to enable data communication with the 5G-NR UE.

Depending on how spread out the 5G-NR UEs are in a coverage cell served by the 5G-NR gNB 202, the 5G-NR gNB 202 may need to simultaneously radiate multiple RF beams 200 toward the 5G-NR UEs based on a particular RF beam pattern. Hereinafter, an RF beam pattern refers to a collection of one or more of the RF beams 200 each having a respective beamwidth and a respective beam direction. A beamwidth refers to the widest spatial spread of a main lobe in each of the RF beams 200 and a beam direction refers to a radiation direction of the main lobe. In this regard, it is possible to change the actual number, the radiation direction, and the spatial spread of the RF beams 200 by adapting the RF beam pattern of the RF beams 200.

FIG. 3 is a schematic diagram of an exemplary WCS 300 configured according to any of the embodiments disclosed herein to support dynamic RF beam pattern adaptation. The WCS 300 supports both legacy 4G LTE, 4G/5G non-standalone (NSA), and 5G standalone communications systems. As shown in FIG. 3, a centralized services node 302 is provided that is configured to interface with a core network to exchange communications data and distribute the communications data as radio signals to remote units. In this example, the centralized services node 302 is configured to support distributed communications services to an mmWave radio node 304. Despite that only one of the mmWave radio node 304 is shown in FIG. 3, it should be appreciated that the WCS 300 can be configured to include additional numbers of the mmWave radio node 304, as needed. The functions of the centralized services node 302 can be virtualized through an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

The mmWave radio node 304, the O-RAN RU 312, the LPR 324, the dRAU 326, the dMRU 328, and the dHRU 330 may each include an antenna array to form the RF beams 200 in FIG. 2A. For the convenience of reference, the mmWave radio node 304, the O-RAN RU 312, the LPR 324, the dRAU 326, the dMRU 328, and the dHRU 330 are collectively referred to as a wireless device. The wireless device is typically mounted on a fixed structure, such as a ceiling or a wall of a building, as an example. As shown in the examples in FIGS. 4A and 4B, it is necessary for the wireless device to adapt RF beam pattern based on how the wireless device is installed.

Figure 4A:
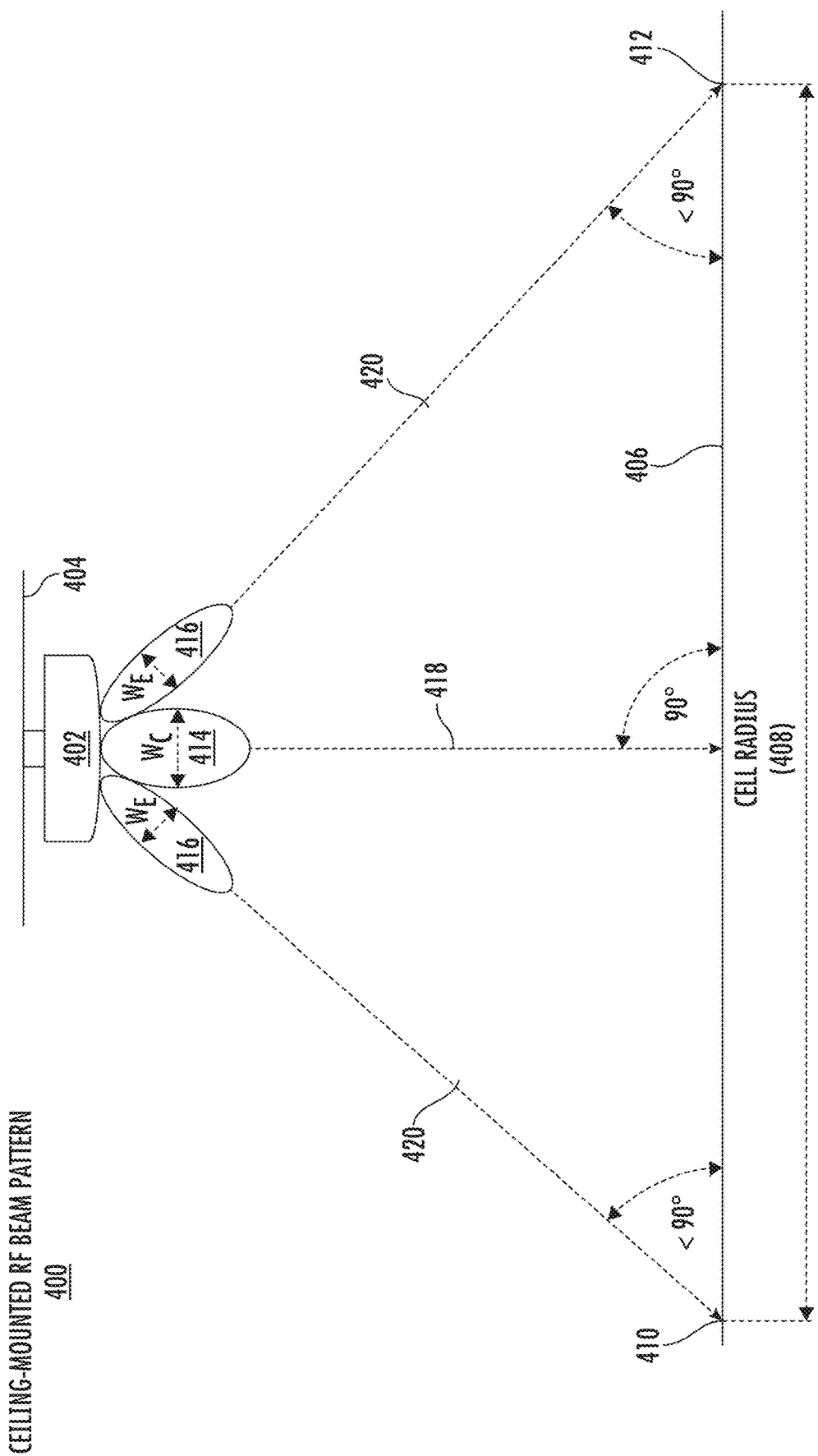
FIG. 4A is a schematic diagram providing an exemplary illustration of a ceiling-mounted RF beam pattern for a wireless device mounted on a ceiling.

FIG. 4A is a schematic diagram providing an exemplary illustration of a ceiling-mounted RF beam pattern 400 for a wireless device 402 mounted on a ceiling 404. As shown in FIG. 4A, the wireless device 402 is facing straight down toward a ground 406. The wireless device 402 is configured to cover a cell radius 408 defined by a pair of edge points 410, 412.

In a non-limiting example, the wireless device 402 is configured to form at least one center RF beam 414 and a number of edge RF beams 416. The center RF beam 414 is radiated with at least one center beamwidth $W_C$ and in at least one center beam direction 418 that is perpendicular (90°) to the ground 406. Each of the edge RF beams 416 has a respective edge beamwidth $W_E$ and radiates in a respective edge beam direction 420 that forms an acute angle (<90°) relative to the ground 406. Understandably, the center RF beam 414 will reach the ground 406 through a shorter propagation distance than any of the edge RF beams 416. As such, the center beamwidth $W_C$ can be wider than the edge beamwidth $W_E$. Herein, the center RF beam 414, the edge RF beams 416, the center beam direction 418, the edge beam direction 420, the center beamwidth $W_C$, and the edge beamwidth $W_E$ collectively define the ceiling-mounted RF beam pattern 400.

Figure 4B:
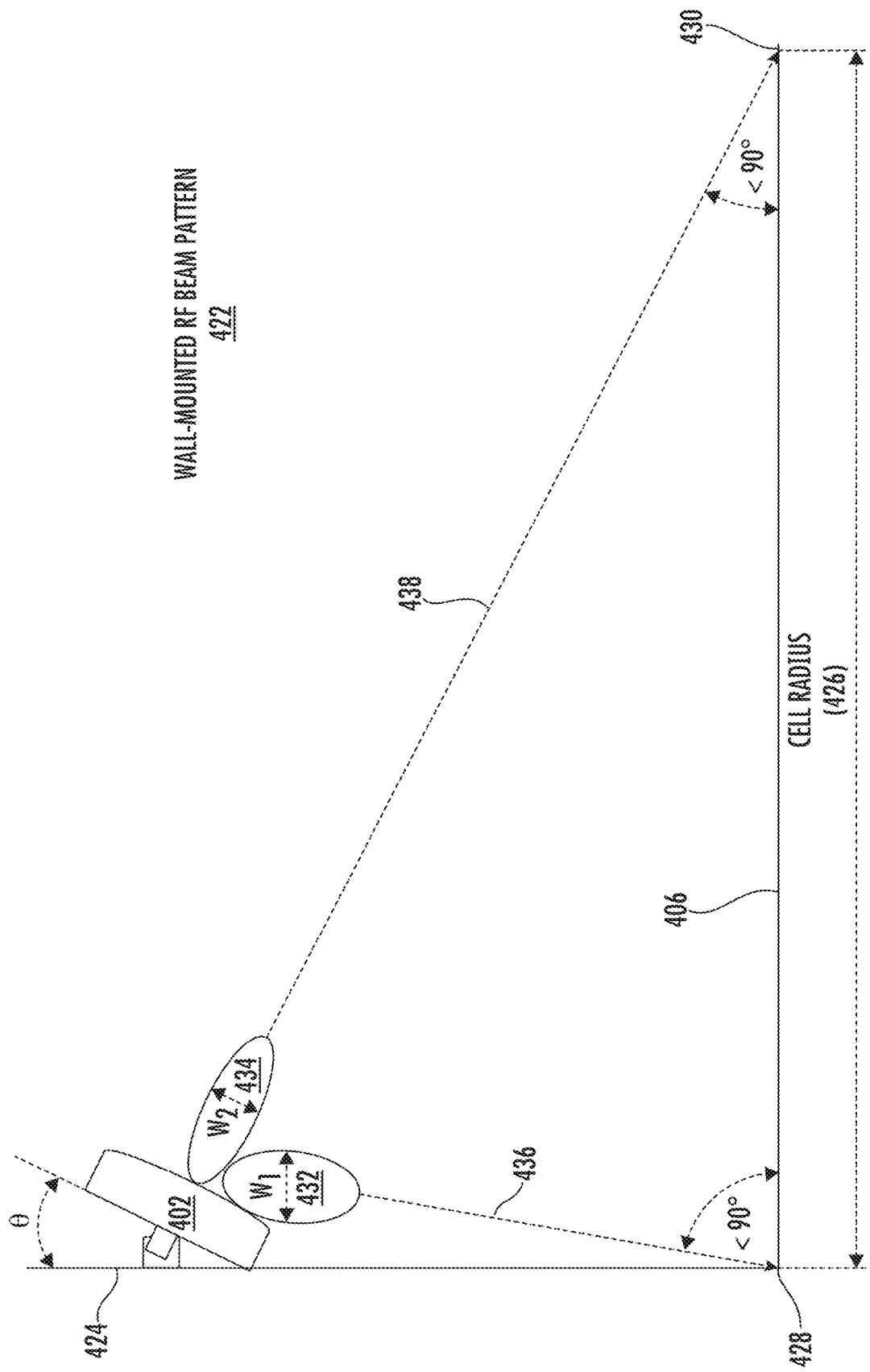
FIG. 4B is a schematic diagram providing an exemplary illustration of a wall-mounted RF beam pattern for a wireless device mounted on a wall.

FIG. 4B is a schematic diagram providing an exemplary illustration of a wall-mounted RF beam pattern 422 for the wireless device 402 of FIG. 2A mounted on a wall 424. As shown in FIG. 4B, the wireless device 402 is not facing straight down toward the ground 406 but has a tilt angle θ relative to the wall 424. Herein, the wireless device 402 is configured to cover a cell radius 426 defined by a pair of edge points 428, 430.

In a non-limiting example, the wireless device 402 is configured to form at least one first RF beam 432 and a second RF beam 434. The first RF beam 432 is radiated with at least one first beamwidth $W_1$ and in at least one first beam direction 436 that points toward the wall 424. The second RF beam 434 has a second beamwidth $W_2$ and radiates in a second beam direction 438 that points away from the wall 424. Understandably, the first RF beam 432 will reach the ground 406 through a shorter propagation distance than the second RF beam 434. As such, the first beamwidth $W_1$ can be wider than the second beamwidth $W_2$. Herein, the first RF beam 432, the second RF beam 434, the first beam direction 436, the second beam direction 438, the first beamwidth $W_1$, and the second beamwidth $W_2$ collectively define the wall-mounted RF beam pattern 422.

Figure 5:
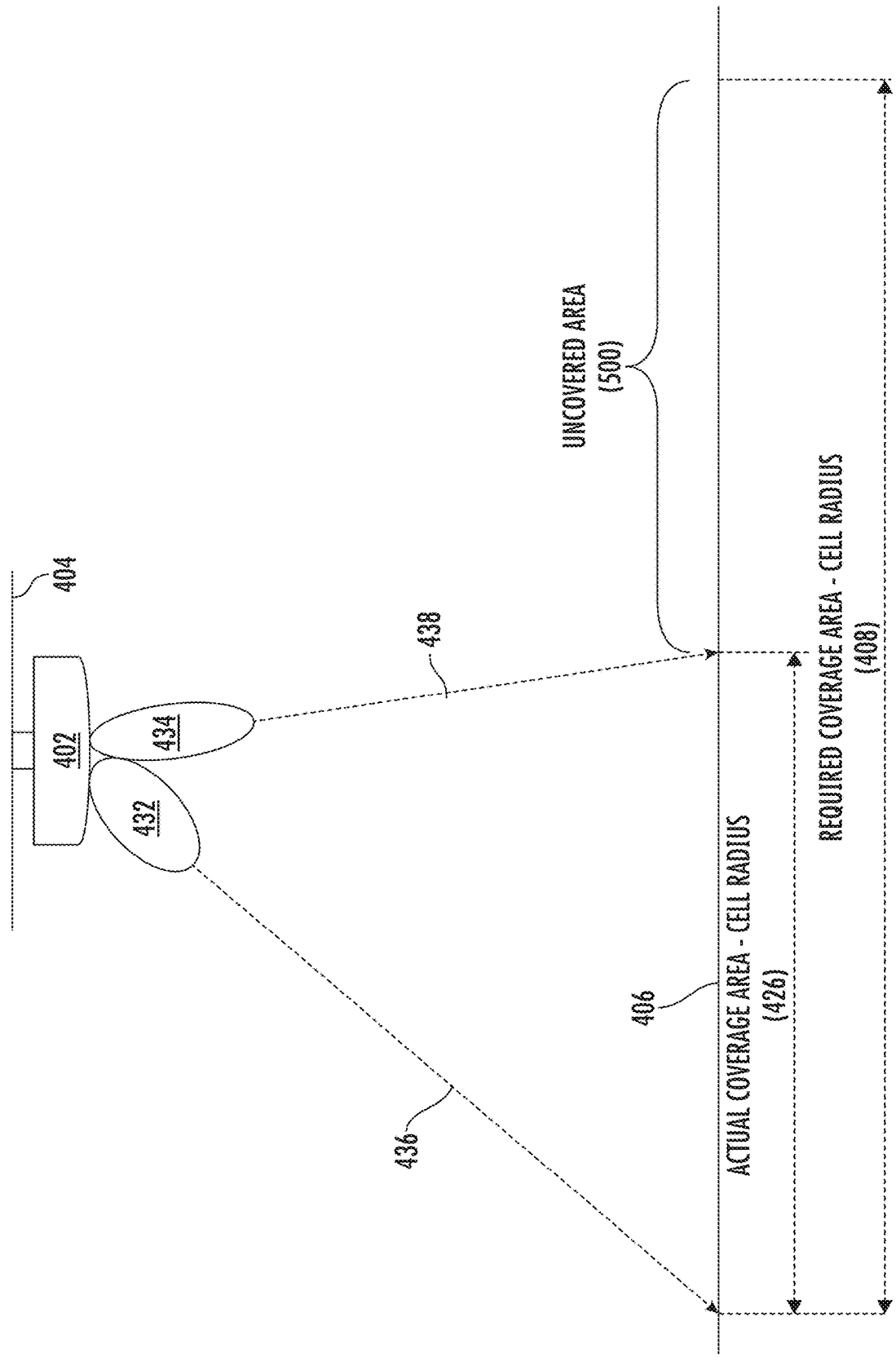
FIG. 5 is a schematic diagram providing an exemplary illustration of an undesirable RF beam pattern employed by the wireless device in FIGS. 4A and 4B.

The wireless device 402 may have been preconfigured (e.g., at a factory or test lab) with a default RF beam pattern, such as the wall-mounted RF beam pattern 422 of FIG. 4B, which will work well when the wireless device 402 is mounted on the wall 424. However, the wireless device 402 may be actually mounted on the ceiling 404 instead of the wall 424. As a result, the wireless device 402 may not be able to provide adequate coverage for an intended coverage area. In this regard, FIG. 5 is a schematic diagram providing an exemplary illustration of an undesirable RF beam pattern employed by the wireless device 402 in FIGS. 4A and 4B. Common elements between FIGS. 4A, 4B, and 5 are shown therein with common element numbers and will not be re-described herein.

As shown in FIG. 5, the wireless device 402, which has been preconfigured to operate based on the wall-mounted RF beam pattern 422 of FIG. 4B, is actually mounted on the ceiling 404. According to the previous discussion in FIG. 4B, the wall-mounted RF beam pattern 422 is able to cover an actual coverage area having the cell radius 426. However, the wireless device 402 needs to cover a required coverage area having the cell radius 408, as enabled by the ceiling-mounted RF beam pattern 400 of FIG. 4A. As a result of operating based on an undesirable RF beam pattern, the wireless device 402 leaves an uncovered area 500 (also referred to as a "coverage deficit"). Hence, it is desirable for the wireless device 402 to dynamically detect an actual orientation and automatically adapt from the wall-mounted RF beam pattern 422 to the ceiling-mounted RF beam pattern 400 when the wireless device 402 is actually mounted on the ceiling 404 instead of the wall 424.

Figure 6A:
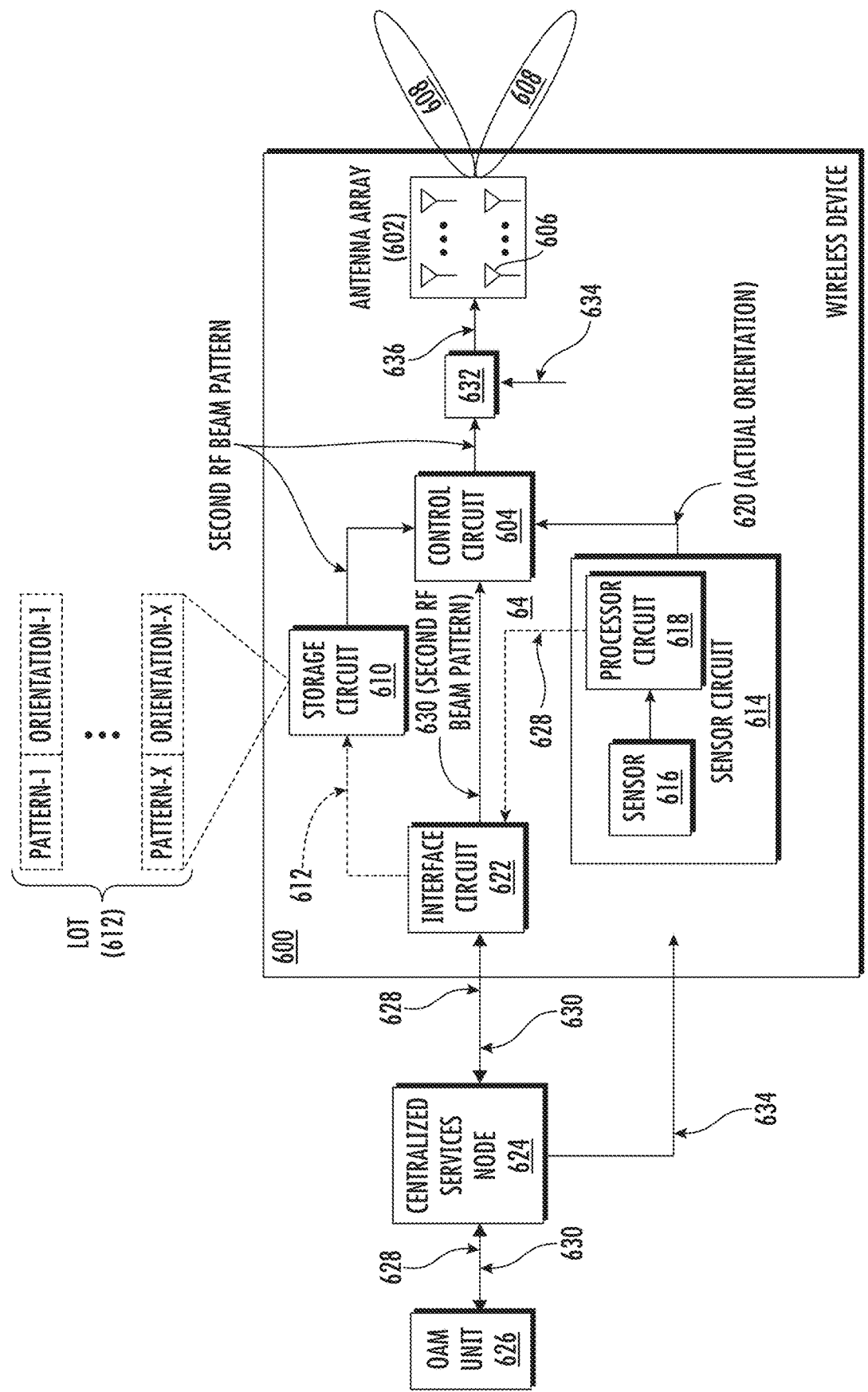
FIG. 6A is a schematic diagram of an exemplary wireless device configured according to embodiments of the present disclosure to support dynamic RF beam pattern adaptation.

In this regard, FIG. 6A is a schematic diagram of a wireless device 600 configured according to embodiments of the present disclosure to dynamically perform RF beam pattern adaptation. In a non-limiting example, the wireless device 600 can be identical or functionally equivalent to any of the mmWave radio node 304, the O-RAN RU 312, the LPR 324, the dRAU 326, the dMRU 328, and the dHRU 330 in the WCS 300 of FIG. 3. Notably, the wireless device 600 can be adapted to support the ceiling-mounted RF beam pattern 400 in FIG. 4A, the wall-mounted RF beam pattern 422 in FIG. 4B, and/or any other RF beam patterns as needed.

The wireless device 600 includes an antenna array 602 and a control circuit 604. The antenna array 602 includes a plurality of antenna elements 606 configured to radiate one or more RF beams 608 based on a first RF beam pattern (e.g., the ceiling-mounted RF beam pattern 400 or the wall-mounted RF beam pattern 422) that corresponds to a configured orientation (e.g., ceiling mounting or wall mounting). Herein, an orientation of the wireless device 600 refers to a set of coordinates (e.g., a zenith angle and an azimuth angle) in a spherical coordinate system.

The control circuit 604 can be a field-programmable gate array (FPGA), a central processing unit (CPU), or a general-purpose processor (GPP), as an example. As discussed in detail below, the control circuit 604 is configured to dynamically determine an actual orientation (e.g., ceiling mounting or wall mounting) of the wireless device 600 and a second RF beam pattern (e.g., the ceiling-mounted RF beam pattern 400 or the wall-mounted RF beam pattern 422) corresponding to the determined actual orientation. Accordingly, the control circuit 604 can cause the RF beams 608 to be radiated based on the second RF beam pattern if the second RF beam pattern is different from the first RF beam pattern. By dynamically detecting the actual orientation and automatically adapting the RF beam pattern, it is possible to reduce installation and calibration time associated with deployment of the wireless device 600 in the WCS 300 of FIG. 3. As an example, it is also possible to eliminate the coverage deficit in FIG. 5.

The wireless device 600 can be configured to perform dynamic RF beam pattern adaptation based on a process. In this regard, FIG. 7 is a flowchart of an exemplary process 700 that can be employed by the wireless device 600 of FIG. 6A to perform dynamic RF beam pattern adaptation.

According to the process 700, the wireless device 600 can be configured (e.g., at a factory or calibration lab) to radiate the RF beams 608 based on a first RF beam pattern that corresponds to a configured orientation (step 702). The control circuit 604 is configured to determine an actual orientation of the wireless device 600 (step 704) and thereby determine a second RF beam pattern corresponding to the actual orientation (step 706). Accordingly, the control circuit 604 can be configured to cause the RF beams 608 to be radiated based on the second RF beam pattern if the second RF beam pattern is different from the first RF beam pattern (step 708).

With reference back to FIG. 6A, in one embodiment, the actual orientation can be automatically determined locally inside the wireless device 600. In this regard, the wireless device 600 can include a storage circuit 610, which can include such data storing devices as registers and memories, for example, to store a look-up table (LOT) 612. The LOT 612 may be preprogrammed into the storage circuit 610 during calibration or factory testing. In a non-limiting example, the LOT 612 can include a plurality of configured RF beam patterns Pattern-1-Pattern-X each corresponding to a respective one of a plurality of orientations Orientation-1-Orientation-X. Accordingly, the control circuit 604 can determine the second RF beam pattern as one of the configured RF beam patterns Pattern-1-Pattern-X having the respective one of the orientations Orientation-1-Orientation-X that is closest to the actual orientation in the LOT 612.

To be able to dynamically detect the actual orientation, the wireless device 600 can further include a sensor circuit 614.

In a non-limiting example, the sensor circuit 614 can include a sensor 616 (e.g., accelerometer sensor) and a processor circuit 618 (e.g., a CPU or an FPGA). The sensor 616 may be configured to detect the actual orientation (e.g., the zenith angle and the azimuth angle in the spherical coordinate system). The processor circuit 618 may be configured to process the actual orientation detected by the sensor 616 and generate a sensory signal 620 to indicate the actual orientation to the control circuit 604.

In another embodiment, the second RF beam pattern can also be determined remotely, outside the wireless device 600. In this regard, the wireless device 600 can include an interface circuit 622. The interface circuit 622 may be coupled to a centralized services node 624, which can be identical or functionally equivalent to the centralized services node 302 in the WCS 300 of FIG. 3. The centralized services node 624 can be further coupled to an operation, administration, and management (OAM) unit 626, which can be located in a premises of a wireless operation.

In this regard, the processor circuit 618 may be configured to determine a mismatch between the actual orientation and the configured orientation. Accordingly, the processor circuit 618 may generate a mismatch notification 628 to thereby request the first RF beam pattern to be changed. The processor circuit 618 may provide the mismatch notification 628 to the centralized services node 624 and/or the OAM unit 626 via the interface circuit 622. The centralized services node 624 and/or the OAM unit 626 may determine the second RF beam pattern based on the mismatch notification 628. Accordingly, the centralized services node 624 and/or the OAM unit 626 may provide a pattern change notification 630 that includes the second RF beam pattern. The control circuit 604 receives the pattern change notification 630 and thereby causes the RF beams 608 to be radiated based on the second RF beam pattern. Notably, the OAM unit 626 and/or the centralized services node 624 may also dynamically change content of the LOT 612 in the wireless device 600.

In a non-limiting example, the control circuit 604 can adapt an RF beam pattern of the RF beams 608 through a beamforming circuit 632. In a non-limiting example, the beamforming circuit 632 can pre-process an RF communications signal 634 based on a beam weight set, which includes multiple beam weights corresponding to the antenna elements 606, respectively, to generate a plurality of weighted RF signals 636. The weighted RF signals 636 are each coupled to a respective one of the antenna elements 606 in the antenna array 602 to simultaneously form the RF beams 608. As previously discussed in FIG. 2A, by pre-processing the RF signal 634 based on the beam weight set, it is possible to form the RF beams 608 based on a desired RF beam pattern.

Figure 6B:
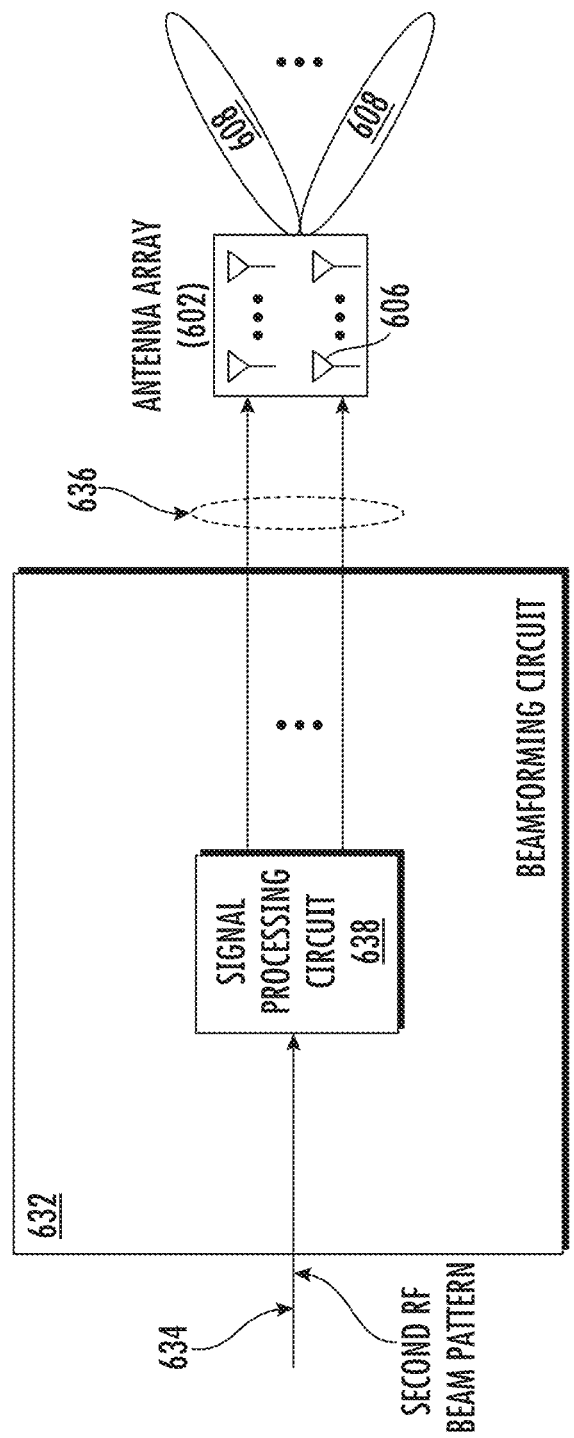
FIG. 6B is a schematic diagram of an exemplary beam-forming circuit that can be provided in the wireless device of FIG. 6A to enable dynamic RF beam pattern adaptation.

FIG. 6B is a schematic diagram providing an exemplary illustration of the beamforming circuit 632 in the wireless device 600 of FIG. 6A to enable dynamic RF beam pattern adaptation. Common elements between FIGS. 6A and 6B are shown therein with common element numbers and will not be re-described herein.

In a non-limiting example, the beamforming circuit 632 includes a signal processing circuit 638. The signal processing circuit 638 is configured to determine the beam weight set based on the second RF beam pattern, as provided by the control circuit 604. Accordingly, the processing circuit 632 can pre-process the RF communications signal 634 based on the determined beam weight set to cause the RF beams 608 to be radiated based on the second RF beam pattern.

Figure 8:
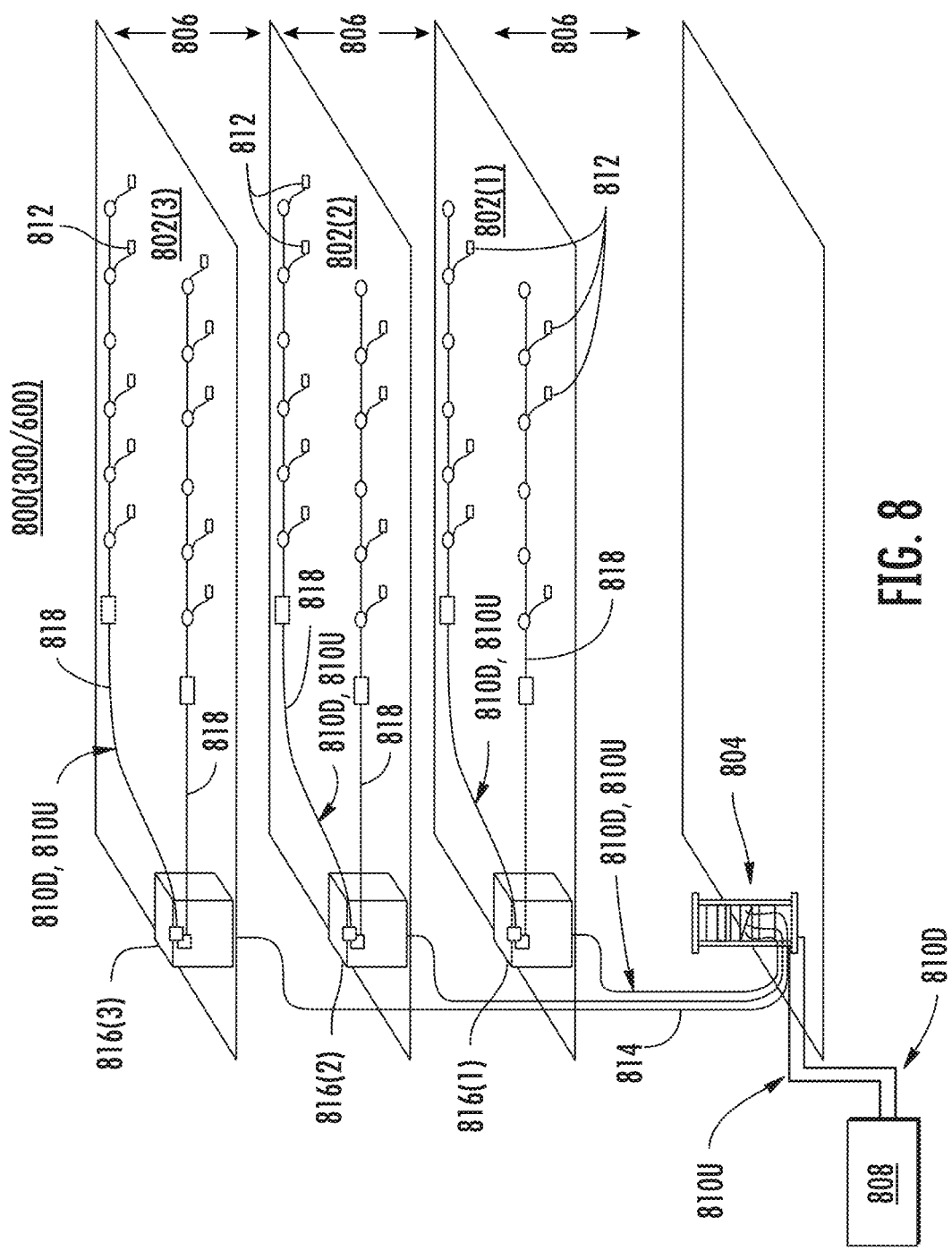
FIG. 8 is a partial schematic cut-away diagram of an exemplary building infrastructure in a WCS, such as the WCS of FIG. 3 that includes the network device of FIG. 4 for supporting dynamic network resource management.

The WCS 300 of FIG. 3, which can include the wireless device 600 in FIG. 6A, can be provided in an indoor environment as illustrated in FIG. 8. FIG. 8 is a partial schematic cut-away diagram of an exemplary building infrastructure 800 in a WCS, such as the WCS 300 of FIG. 3 that includes the wireless device 600 of FIG. 6A. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
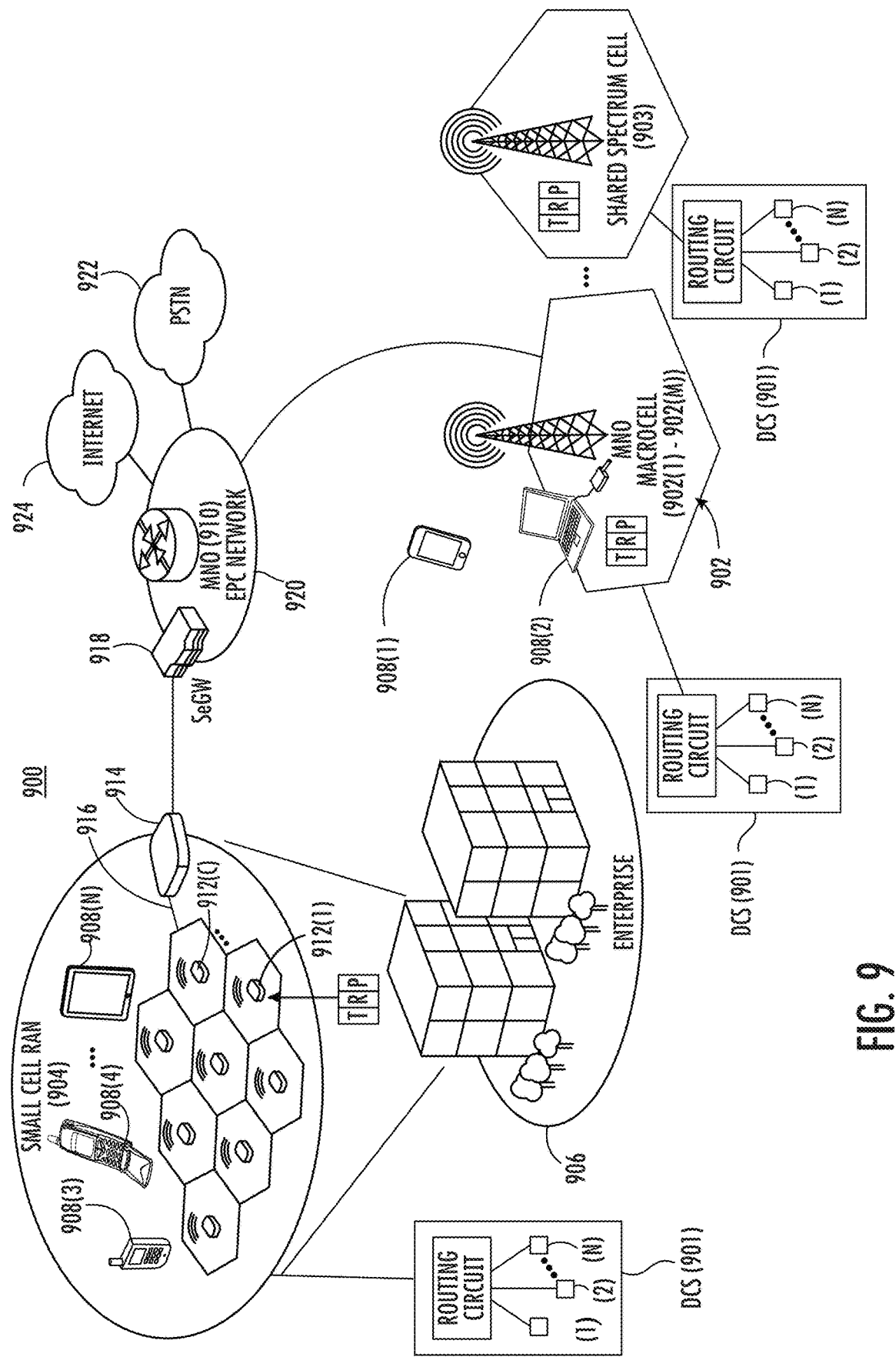
FIG. 9 is a schematic diagram of an exemplary mobile telecommunications environment that can includes the WCS of FIG. 3 that includes the network device of FIG. 4 for supporting dynamic network resource management.

The WCS 300 of FIG. 3 and the wireless device 600 of FIG. 6A, configured to enable dynamic network resource management, can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to shared spectrum WCSs 901 supporting coordination of distribution of shared spectrum from multiple service providers to remote units to be distributed to subscriber devices. The shared spectrum WCSs 901 can include the WCS 300 of FIG. 3 that includes the wireless device 600 of FIG. 6A, as an example.

The environment 900 includes exemplary macrocell RANs 902(1)-902(M) ("macrocells 902(1)-902(M)") and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901 supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of the user mobile communications devices 908(3)-908(N).

In FIG. 9, the mobile telecommunications environment 900 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise environment 906 in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station, or "macrocell" 902. The radio coverage area of the macrocell 902 is typically much larger than that of a small cell where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the environment 900.

Figure 10:
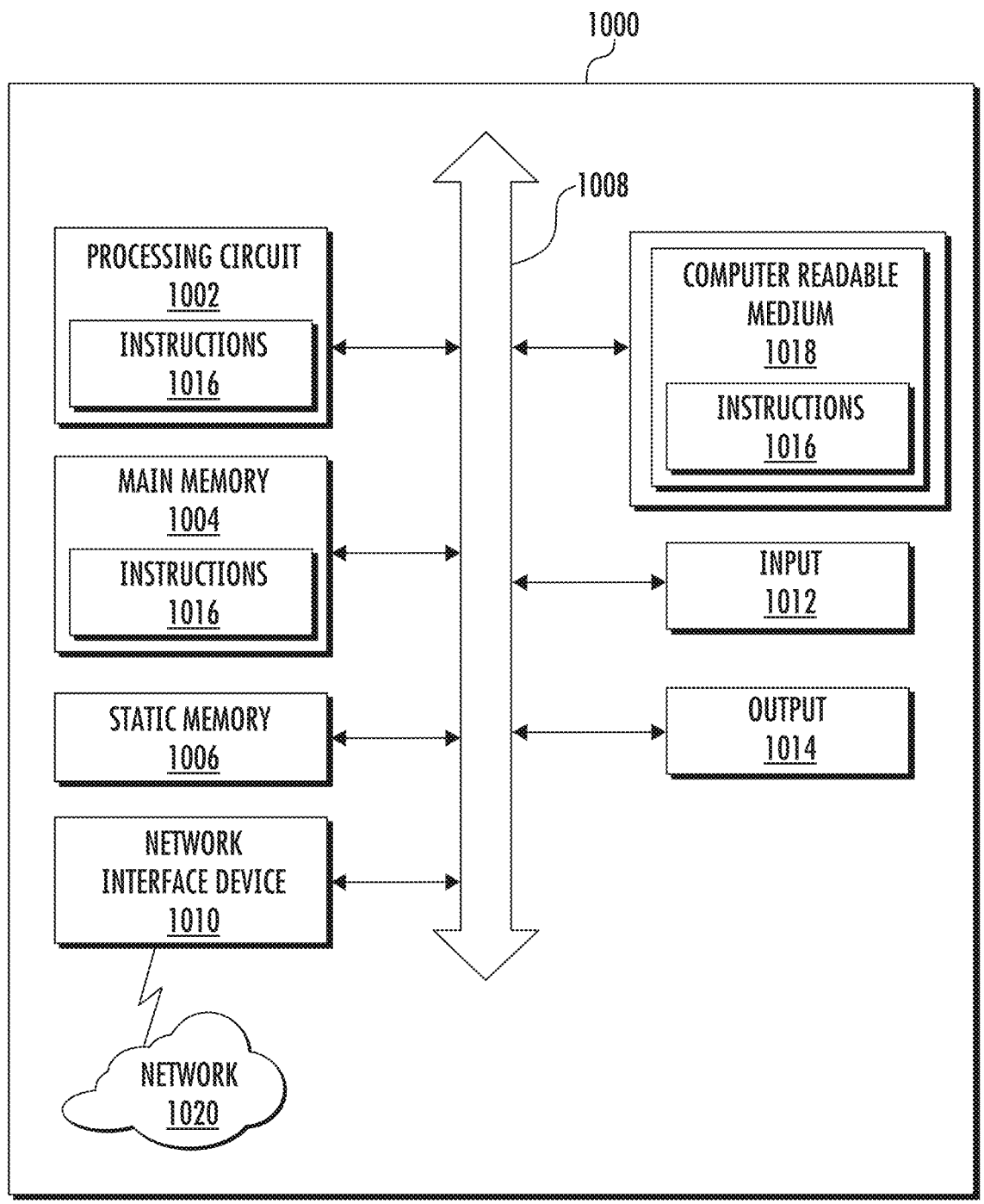
FIG. 10 is a schematic diagram of a representation of an exemplary computer system that can be included in or interfaced with any of the components in the WCS of FIG. 3 and the network device in FIG. 4 for support dynamic network resource management, wherein the exemplary computer system is configured to execute instructions from an exemplary computer-readable medium.

Any of the circuits in the WCS 300 of FIG. 3 and the wireless device 600 of FIG. 6A, such as the control circuit 604 and/or the processor circuit 618, can include a computer system 1000, such as that shown in FIG. 10, to carry out their functions and operations. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless device, comprising:
   an antenna array configured to radiate one or more radio frequency (RF) beams based on a first RF beam pattern corresponding to a configured orientation;
   a control circuit configured to:
   determine an actual orientation of the wireless device;
   receive a pattern change notification that indicates a second RF beam pattern;
   determine the second RF beam pattern corresponding to the actual orientation; and
   cause the one or more RF beams to be radiated based on the second RF beam pattern in response to the second RF beam pattern being different from the first RF beam pattern; and
   a sensor circuit configured to:
   detect the actual orientation of the wireless device; and
   generate a sensory signal to indicate the actual orientation to the control circuit,
   wherein the sensor circuit comprises:
   an accelerometer sensor configured to detect the actual orientation; and
   a processor circuit configured to:
   generate the sensory signal to indicate the actual orientation to the control circuit;
   determine a mismatch between the actual orientation and the configured orientation; and
   generate a mismatch notification to thereby request the first RF beam pattern to be changed.

2. The wireless device of claim 1, further comprising a storage circuit configured to store a plurality of configured RF beam patterns each corresponding to a respective one of a plurality of orientations, wherein the control circuit is further configured to determine the second RF beam pattern as one of the plurality of configured RF beam patterns having the respective one of the plurality of orientations that is closest to the actual orientation.

3. The wireless device of claim 1, further comprising:
   an interface circuit coupled to a centralized service node and an operation, administration, and management (OAM) unit, the interface circuit is configured to receive the pattern change notification that indicates the second RF beam pattern; and
   a beamforming circuit configured to cause the one or more RF beams to be radiated based on the second RF beam pattern.

4. The wireless device of claim 1, wherein the control circuit is further configured to:
   determine that the wireless device is mounted on a ceiling based on the actual orientation; and
   determine the second RF beam pattern that comprises:
   at least one center RF beam having at least one center beamwidth and at least one center beam direction that is perpendicular to a ground; and
   a plurality of edge RF beams each having a respective edge beamwidth narrower than the at least one center beamwidth and a respective edge beam direction having an acute angle relative to the ground.

5. The wireless device of claim 1, wherein the control circuit is further configured to:
   determine that the wireless device is mounted on a wall based on the actual orientation; and
   determine the second RF beam pattern that comprises:
   at least one first RF beam having at least one first beamwidth and at least one first beam direction pointing toward the wall; and
   one or more second RF beams each having a respective second beamwidth narrower than the at least one first beamwidth and a respective second beam direction pointing away from the wall.

6. A method for enabling dynamic radio frequency (RF) beam pattern adaptation in a wireless device in a wireless communications system (WCS), comprising:
   configuring the wireless device to radiate one or more RF beams based on a first RF beam pattern corresponding to a configured orientation;
   determining an actual orientation of the wireless device;
   determining a mismatch between the actual orientation and the configured orientation;
   generating a mismatch notification to thereby request the first RF beam pattern to be changed;
   receiving a pattern change notification that indicates a second RF beam pattern;
   determining the second RF beam pattern corresponding to the actual orientation; and
   causing one or more RF beams to be radiated based on the second RF beam pattern in response to the second RF beam pattern being different from the first RF beam pattern.

7. The method of claim 6, further comprising:
   storing a plurality of configured RF beam patterns each corresponding to a respective one of a plurality of orientations in the wireless device; and
   determining the second RF beam pattern as one of the plurality of configured RF beam patterns having the respective one of the plurality of orientations that is closest to the actual orientation.

8. The method of claim 6, further comprising:
   determining the second RF beam pattern based on the mismatch notification; and
   generating the pattern change notification to indicate the second RF beam pattern.

9. The method of claim 6, further comprising:
   determining that the wireless device is mounted on a ceiling based on the actual orientation; and determining the second RF beam pattern that comprises:
at least one center RF beam having at least one center beamwidth and at least one center beam direction that is perpendicular to a ground; and
a plurality of edge RF beams each having a respective edge beamwidth narrower than the at least one center beamwidth and a respective edge beam direction having an acute angle relative to the ground.

10. The method of claim 6, further comprising:
determining that the wireless device is mounted on a wall based on the actual orientation; and
determining the second RF beam pattern that comprises:
at least one first RF beam having at least one first beamwidth and at least one first beam direction pointing toward the wall; and
one or more second RF beams each having a respective second beamwidth narrower than the at least one first beamwidth and a respective second beam direction pointing away from the wall.

11. A wireless communications system (WCS), comprising:
a wireless device, comprising:
an antenna array configured to radiate one or more radio frequency (RF) beams based on a first RF beam pattern corresponding to a configured orientation;
a control circuit configured to:
determine an actual orientation of the wireless device;
determine a second RF beam pattern corresponding to the actual orientation;
receive a pattern change notification that indicates the second RF beam pattern; and
cause the one or more RF beams to be radiated based on the second RF beam pattern in response to the second RF beam pattern being different from the first RF beam pattern; and
a sensor circuit configured to:
determine a mismatch between the actual orientation and the configured orientation; and
generate a mismatch notification to thereby request the first RF beam pattern to be changed.

12. The WCS of claim 11, wherein the wireless device further comprises a storage circuit configured to store a plurality of configured RF beam patterns each corresponding to a respective one of a plurality of orientations, wherein the control circuit is further configured to determine the second RF beam pattern as one of the plurality of configured RF beam patterns having the respective one of the plurality of orientations that is closest to the actual orientation.

13. The WCS of claim 11, wherein the wireless device further comprises:
an interface circuit coupled to a centralized services node and an operation, administration, and management (OAM) unit, wherein the centralized services node is configured to:
determine the second RF beam pattern based on the mismatch notification; and
provide the pattern change notification to the control circuit to indicate the second RF beam pattern; and
a beamforming circuit configured to cause the one or more RF beams to be radiated based on the second RF beam pattern.

14. The WCS of claim 13, further comprising a distributed communications system (DCS), the DCS comprising:
a digital routing unit (DRU) coupled to the centralized services node via a baseband unit (BBU); and
a plurality of remote units each coupled to the DRU via a plurality of optical fiber-based communications mediums, respectively;
wherein:
the DRU is configured to:
receive a downlink communications signal from the centralized services node;
convert the downlink communications signal into a plurality of downlink communications signals;
distribute the plurality of downlink communications signals to the plurality of remote units, respectively;
receive a plurality of uplink communications signals from the plurality of remote units, respectively;
convert the plurality of uplink communications signals into an uplink communications signal; and
provide the uplink communications signal to the centralized services node.

15. The WCS of claim 14, wherein:
the DRU comprises:
an electrical-to-optical (E/O) converter configured to convert the plurality of downlink communications signals into a plurality of downlink optical communications signals, respectively; and
an optical-to-electrical (O/E) converter configured to convert a plurality of uplink optical communications signals into the plurality of uplink communications signals, respectively; and
the plurality of remote units each comprises:
a respective O/E converter configured to convert a respective one of the plurality of downlink optical communications signals into a respective one of the plurality of downlink communications signals; and
a respective E/O converter configured to convert a respective one of the plurality of uplink communications signals into a respective one of the plurality of uplink optical communications signals.

* * * * *